Dec. 23, 1969 G. A. KENT ET AL 3,485,947

TELEVISION SYNCHRONIZING SIGNAL SEPARATOR CIRCUIT

Filed Aug. 22, 1966 2 Sheets-Sheet 1

INVENTOR
George A. Kent
Richard J. Waring
BY Pendleton, Neuman, Seibold & Williams
Attorneys INVENTOR.
George A. Kent
Richard J. Waring
BY Pendleton, Neuman, Seibold & Williams
Attorneys United States Patent Office 3,485,947

Patented Dec. 23, 1969

3,485,947

TELEVISION SYNCHRONIZING SIGNAL SEPARATOR CIRCUIT

George A. Kent, Fort Wayne, and Richard J. Waring, Auburn, Ind., assignors to The Magnavox Company, Fort Wayne, Ind., a corporation of Delaware Filed Aug. 22, 1966, Ser. No. 574,069
Int. Cl. H04n 5/44
U.S. Cl. 178—7.3 4 Claims

ABSTRACT OF THE DISCLOSURE

An A.C. coupled synchronizing signal separator circuit for a television receiver is disclosed which provides strong output pulses under both weak and strong input signal conditions. In the embodiment described a variable bias level taken from the output of a keyed AGC stage is applied to the base of a transistor amplifier device in the separator circuit so that the amplifier will be driven to saturation during peaks of the input signal to the separator irrespective of variations in the strength of that signal. Driving the amplifier to saturation results in optimum noise clipping and high gain of the separator circuit.

This invention relates to a synchronizing signal separator circuit for television receivers and more particularly to a very stable and reliable circuit which is highly immune to noise signals and which produces strong output synchronizing pulses at a uniform level under both weak and strong input signal conditions. The circuit of this invention is comparatively simple in construction and operation, uses a minimum number of component parts, and is inexpensive in construction.

Prior art synchronizing signal separator circuits have generally been satisfactory in operation under strong input signal conditions but have usually been erratic in operation and adversely affected by noise signals under weak signal conditions. An additional difficulty has been that if component values are adjusted or chosen to obtain the best possible operation under weak signal conditions, the circuits have not operated satisfactorily under strong input signal conditions.

This invention was evolved with the general object of overcoming the disadvantages of prior circuits and of providing a television receiver having a synchronizing signal separator circuit which has optimum operation under both weak and strong signal conditions.

Another object of the invention is to provide a synchronizing signal separator circuit which is highly immune to noise signals.

A further object of the invention is to provide a circuit in which the values of component parts are not critical.

Still another object of the invention is to provide a circuit which uses a minimum number of component parts and which is inexpensive in construction.

According to this invention, a video signal is applied from a detector circuit to a synchronizing signal separator circuit which responds to portions of the video signal within a certain range to develop an output signal in the form of synchronizing pulses, and control means are provided for regulating the level of operation of the separator circuit relative to the level of the video signal to produce maximum correspondence of the output signal to the synchronizing pulse components of the video signal. With this regulation of the level of operation of the separator circuit relative to the level of the video signal, optimum operation can be obtained under both weak and strong signal conditions.

According to a specific feature of the invention, the level control means includes means for developing a control signal having an amplitude corresponding to the amplitude of the carrier component of an amplified modulated carrier signal applied to the detector circuit, the control signal being applied to the separator circuit to control the level of operation thereof.

Preferably, and in accordance with further features of the invention, the control signal is developed by an automatic gain control circuit, and the control signal is also coupled to the IF amplifier to control the gain thereof. The control signal is advantageously developed by keyed AGC circuitry wherein flyback pulses are applied to gate means to charge a capacitor in accordance with the level of the video signal during synchronizing pulse intervals.

Another feature of the invention relates to a circuit arrangement in which the effect of variations of RC time constants in coupling circuits is minimized and wherein optimum correlation of the response of coupling networks is obtained.

In accordance with a further specific feature of the invention, a variable bias signal is applied to an input electrode of an amplifier device in the separator circuit to which the video signal is applied. Preferably, the variable bias signal is effective to cause the saturation of the amplifier device during tips of the synchronizing pulse components irrespective of variations in the amplitude of the video signal.

A still further feature of the invention is in the use of a transistor in the separator circuit with means applying the video signal to the base electrode, and preferably with a variable bias signal being applied through a resistor to the base electrode.

This invention contemplates other objects, features and advantages which will become more fully apparent from the following detailed description taken in conjunction with the accompanying drawings which illustrate a preferred embodiment and in which.

Figure 1:
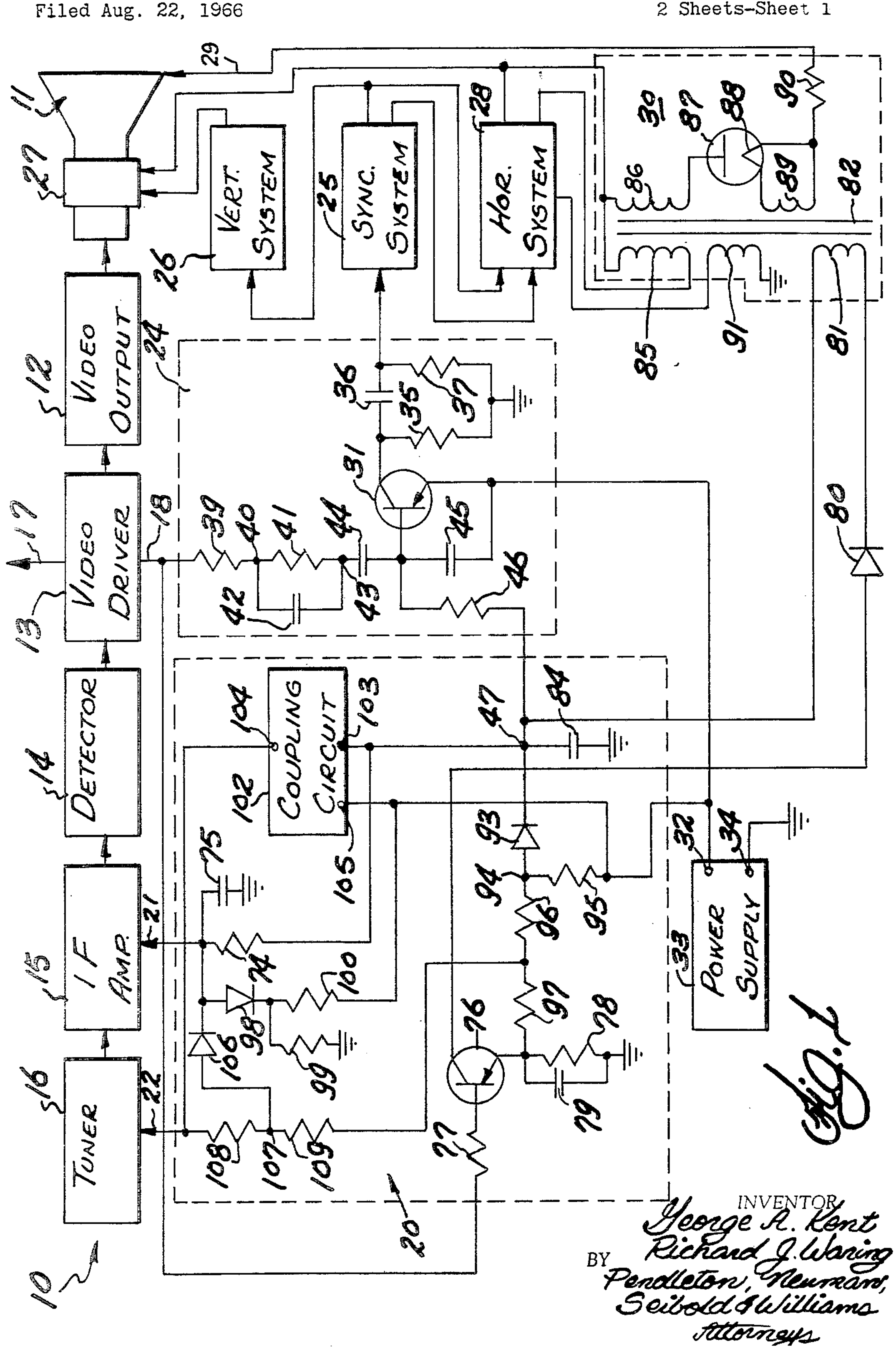
FIGURE 1 is a schematic diagram of a television receiver constructed in accordance with the principles of this invention.

Reference numeral 10 generally designates a television receiver constructed according to the principles of this invention. In general, the receiver 10 comprises a picture tube 11 to which an amplified video vignal is applied from a video output stage 12, an input video signal being applied to the stage 12 through a video driver stage 13 from a detector stage 14. The detector stage 14 produces a video signal by demodulation of an amplified modulated carrier signal supplied by an IF amplifier 15, the input of the IF amplifier 15 being coupled to a tuner 16 which converts a received signal to the IF frequency, and which may include an RF amplifier stage.

An output signal from the video driver stage 13 may be applied through a line 17 to a sound detection and reproduction system (not shown), and an output video signal from the driver stage 13 is also applied through a line 18 to an automatic gain control circuit 20 which supplies a gain control signal on a line 21 to the IF amplifier 15 and which may also apply an automatic gain control signal through a line 22 to an RF amplifier in the tuner 16.

Line 18 is also coupled to a synchronizing signal separator circuit 24 which forms an important feature of the invention and which supplies synchronizing pulses to a synchronizing system 25. The system 25 controls a vertical deflection system 26, connected to a deflection coil assembly 27 for the picture tube 11 and system 25 also controls a horizontal deflection system 28 which is coupled to horizontal deflection coils of the assembly 27. The horizontal system 28 is also coupled to a high voltage rectifier circuit 30 which supplies a high voltage to the screen of the picture tube 11, through a line 29.

The synchronizing signal separator circuit 24 comprises a transistor 31 having an emitter connected to a positive terminal 32 of a power supply 33, a negative terminal 34 of the supply 33 being connected to ground. The collector of the transistor 31 is connected through a load resistor 35 to ground and is also connected through a capacitor 36 to a circuit point which is connected through a resistor 37 to ground and which is also connected to the input of the synchronizing system 25.

A resistance-capacitance coupling network is provided between the line 18 and the base of the transistor 31. In particular, line 18 is connected through a resistor 39 to a circuit point 40 which is connected through a resistor 41 and a capacitor 42 in parallel to a circuit point 43 connected through a capacitor 44 to the base of the transistor 31. The base of the transistor 31 is additionally connected through a capacitor 45 to the emitter thereof and through a resistor 46 to a circuit point 47 forming an output terminal of the automatic gain control circuit 20.

As is described hereinafter, a control signal is developed at the circuit point 47 which has an amplitude corresponding to the amplitude of the carrier component of the amplified modulated carrier signal applied to the detector circuit 14. Through the resistor 46, the control signal is applied to the transistor 31 to control the bias thereof and to regulate the level of operation of the separator circuit 24 relative to the level of the video signal applied thereto, in a manner such as to produce maximum correspondence of the output signal of the separator circuit 24 to the synchronizing pulse components of the video signal.

Figure 2:
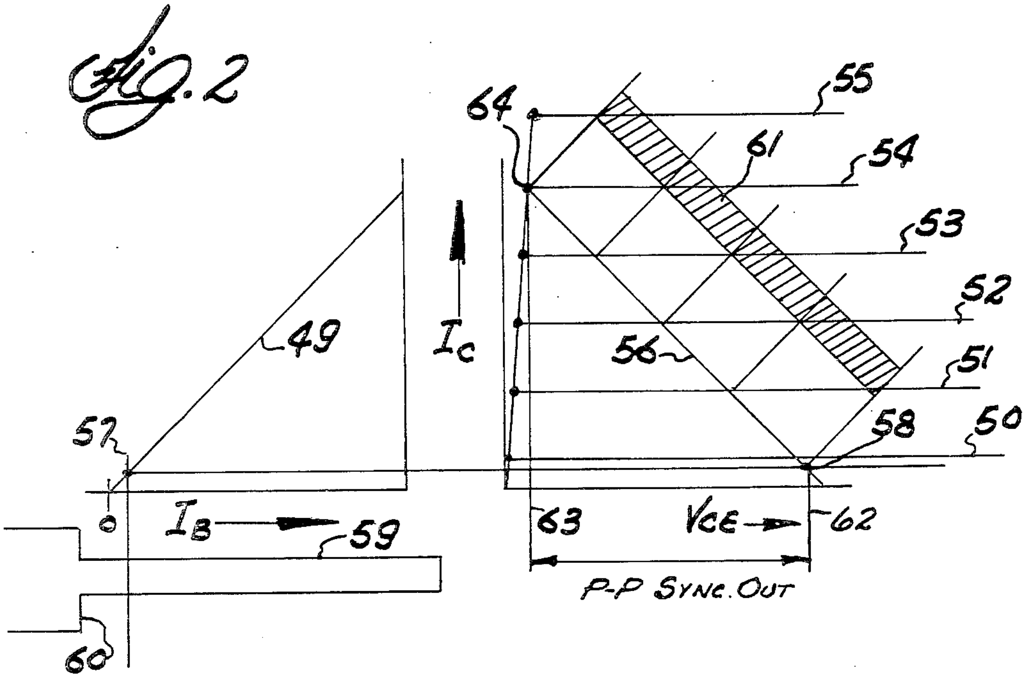
FIGURE 2 is a view showing operating curves and signal wave forms, to explain the operation of the circuit under strong input signal conditions.

FIGURE 2 shows operating curves and signal waveforms, for explanation of the operation of the circuit under strong input signal conditions. In the upper portion of the left-hand part of FIGURE 2, line 49 is a plot of collector current versus base current for the transistor 31 while in the right-hand portion of the figure, lines 50–55 show the saturation collector current characteristics of the transistor 31 at increasing values of base current, with the collector-emitter voltage above a certain value. Line 56 is the "load line," the slope thereof being determined by the value of the resistor 35.

Under strong input signal conditions, a relatively high positive voltage is developed at the circuit point 47 and the emitter-base current of the transistor 31 is relatively small to produce DC operating points as indicated by reference numerals 57 and 58 on the lines 49 and 56. At this time, a video signal is applied including a synchronizing pulse portion 59 on a blanking pedestal 60. The blanking pedestal 60 is at a level slightly below the level of the DC operating point 57, while the tip of the synchronizing pulse portion 59 is at a level such as to drive the transistor 31 into saturation, with a power supply voltage and load resistance being such as to produce the illustrated load line 56. The area 61, shown parallel to the load line 56, graphically indicates the range of operation under such conditions, and an output pulse is produced at the collector of the transistor 31 having an amplitude such as to extend from a line 62 intersecting the DC operating point 58 and a line 63 intersecting a saturation point 64 on the load line 56. During time intervals between synchronizing pulses, the voltage of the collector is indicated by the line 62 while during the tips of the synchronizing pulses, the voltage of the collector of the transistor 31 is indicated by the line 63.

Figure 3:
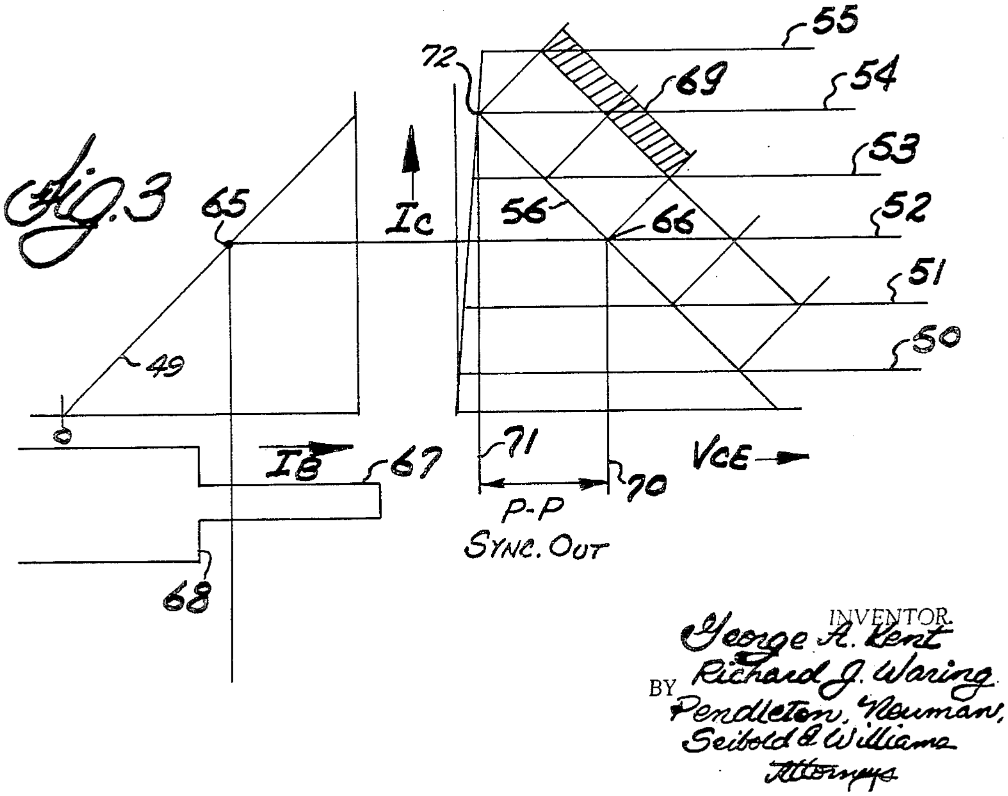
FIGURE 3 is a view showing operating curves and wave forms, for explaining the operation of the circuit under weak input signal conditions.

FIGURE 3 is similar to FIGURE 2, but shows the operation of the circuit under weak input signal conditions. Under such conditions, the voltage of the circuit point 47 is relatively low, and a relatively high emitter-base current flows, to produce DC operating points 65 and 66 on line 49 and load line 56, as indicated. A video signal is applied having a synchronizing pulse portion 67 on a blanking pedestal 68, the blanking pedestal again being only slightly below the level of the DC operating point, and the tip of the synchronizing pulse portion 67 again being such as to drive the transistor 31 into saturation. Area 69 graphically indicates the range of operation under such conditions and lines 70 and 71 indicate the range of swing of the voltage at the collector of transistor 31. Line 70 intersects the DC operating point 66 and line 71 intersects a saturation point 72 which is the same as the saturation point 64 shown in FIGURE 2.

It is very important that under all conditions of operation the tip of the synchronizing pulse is kep in the saturation region, and as a result, optimum noise clipping is obtained. Another very important advantage is that a high gain is obtained in the synchronizing signal separator circuit because at the higher DC bias level, the beta or gain of the transistor 31 is greater.

A further important advantage arises from a particular manner of coaction of the operation of the separator circuit with that of the automatic gain control circuit. When a noise pulse is injected into the input of the receiver during the period when the AGC circuit is gated open, the automatic gain control voltage at circuit point 47 goes more positive. This voltage is applied to the line 21 to control the gain of the IF amplifier 15, through a resistance-capacitance coupling network including a resistor 74 connected between circuit point 47 and the line 21, and a capacitor 75 connected between line 21 and ground. Due to the automatic gain control action, the injection of the noise pulse results in a reduction in the peak-to-peak video at the output of the detector 14 to cause a loss in the synchronizing signal chain for a period of time determined by the RC time constants in the coupling network formed by resistor 74 and capacitor 75 and in the network formed by resistors 39 and 41 and capacitors 42 and 44. However, the increase in the positive voltage at circuit point 47 is applied through the resistor 46 to the base of the transistor 31, in a direction such as to compensate for the change in level of the tip of the synchronizing pulse portion of the video signal, occurring due to the noise pulse. Due to this beneficial action, variations in the RC time constants in the coupling circuits have minimal effect and optimum correlation can be readily obtained between the response times of the coupling networks.

Although other types of circuits might be used for developing a control signal having an amplitude corresponding to the amplitude of the carrier component of the amplified modulated carrier signal, a keyed circuit is preferably used, wherein flyback pulses are applied to gate means to charge a capacitor in accordance with the level of the video signal during synchronizing pulse intervals. In particular, the automatic gain control circuit 20 comprises a transistor 76 having the base connected through a resistor 77 to the line 18 and having an emitter connected to ground through a resistor 78 and a capacitor 79. The collector of the transistor 76 is connected through a diode 80 to one end of a winding 81 of a transformer 82 of the high voltage power supply 30, the other end of the winding 81 being connected to the circuit point 47 which is connected through a capacitor 84 to ground. During flyback time intervals, pulses are developed across the winding 81 having a polarity such as to cause conduction of the diode 80 and of the transistor 76, to charge the capacitor 84 in accordance with the level of the video signal applied to the base of the transistor 76 through the resistor 77.

The high voltage power supply 30 is of conventional construction and it includes a primary winding 85 of the transformer 82, connected to the output of the horizontal deflection system 28, and a high voltage secondary winding 86 connected between one terminal of the winding 85 and the anode of a high voltage rectifier tube 87. A directly heated cathode 88 is connected to a winding 89 of the transformer 82, and one terminal of the cathode is connected through a resistor 90 to the line 29. An additional winding 91 of the transformer 82 is provided to supply flyback pulses to the horizontal deflection system.

The illustrated automatic gain control circuit 20 has additional features which are not essential features of the invention, but which are shown for completeness. In particular, a diode 93 is connected between circuit point 47 and a circuit point 94 which is connected through a resistor 95 to the power supply terminal 32 and which is connected through resistors 96 and 97 to the emitter of the transistor 76. Through this circuit, an initial positive voltage is developed at the circuit point 47, diode 93 being reverse-biased as soon as an automatic gain control voltage is developed. During weak signal conditions, the voltage applied through resistor 74 to the IF amplifier 15 increases rapidly with increasing signal strength to rapidly decrease the gain of the IF amplifier. However, at a certain point, a diode 98 becomes conductive to decrease the rate at which the IF gain is decreased. Diode 98 is connected between line 21 and a circuit point which is connected through a resistor 99 to ground and through a resistor 100 to the power supply terminal 32. At a certain higher received signal strength, a coupling circuit 102 becomes operative to control the gain of an RF amplifier stage in the tuner 16, the coupling circuit 102 having an input terminal 103 connected to circuit point 47, an output terminal 104 connected to the line 22, and an additional terminal 105 connected to the power supply terminal 32. Under strong input signal conditions, the rate of reduction of the gain of the IF amplifier 15 is increased while the rate of reduction of the gain of the RF amplifier of the tuner 16 is decreased. For this purpose, a diode 106 is connected between the line 21 and a circuit point 107 which is connected through a resistor 108 to the line 22 and through a resistor 109 to the junction between resistors 96 and 97.

By way of illustrative example and not by way of limitation, the components may have values according to the following table:

| Reference numeral: | | Value |
|---|---|---|
| 35 | ohms | 10,000 |
| 36 | microfarads | 4 |
| 37 | ohms | 27,000 |
| 39 | do | 820 |
| 41 | do | 820 |
| 42 | microfarads | 0.01 |
| 44 | do | 1 |
| 45 | picofarads | 470 |
| 46 | ohms | 100,000 |
| 74 | do | 5600 |
| 75 | microfarads | 0.2 |
| 77 | ohms | 1800 |
| 78 | do | 100 |
| 79 | microfarads | 50 |
| 84 | do | 4 |
| 95 | ohms | 560 |
| 96 | do | 100 |
| 97 | do | 150 |
| 99 | do | 680 |
| 100 | do | 1300 |
| 108 | do | 100 |
| 109 | do | 560 |

It will be understood that modifications and variations may be effected without departing from the spirit and scope of the novel concepts of this invention.

We claim as our invention:

1. In a television receiver including a tuner for responding to a received RF signal to develop an IF signal, an IF amplifier for amplifying said IF signal, detector means for demodulating the amplified IF signal to produce a video signal having synchronizing pulse components, a picture tube, video amplifier means for applying said video signal to said picture tube, deflection means for said picture tube, a deflection circuit for operating said deflection means and including means for developing horizontal flyback pulses, a synchronizing signal separator circuit having a signal saturation level and operative to respond to portions of an input signal within a certain range to develop an output signal, means for applying said output signal to said deflection circuit, video signal coupling means for A.C. coupling said video signal from said detector means to said separator circuit, keyed automatic gain control means responsive to said flyback pulses and said video signal to develop a control signal having an amplitude corresponding to the level of said synchronizing pulse components of said video signal, gain control coupling means for applying said control signal to said IF amplifier means to control the gain thereof, and means for applying said control signal to said separator circuit to control the level of operation thereof relative to the level of said video signal to provide said output signal at said signal saturation irrespective of substantial variations in said RF signal and to produce maximum correspondence of said output signal to said synchronizing pulse components of said video signal.

2. In a television receiver including amplifier means for supplying an amplified modulated carrier signal, and detector means for demodulating said amplified modulated carrier signal to produce a video signal having synchronizing pulse components, a synchronizing signal separator circuit operative to respond to portions of an input signal within a certain range to develop an output signal, video signal coupling means for applying said video signal to said separator circuit, control means for regulating the level of operation of said separator circuit relative to the level of said video signal and including means for developing a control signal having an amplitude corresponding to the amplitude of the carrier component of said amplified modulated carrier signal, and gain control coupling means for applying said control signal to said amplifier means to decrease the gain of said amplifier means in response to an increase in the amplitude of said carrier component of said amplified modulated carrier signal, said gain control coupling means including a first resistance-capacitance network the RC time constant of which controls the speed at which the gain of said amplifier means is changed in response to a change in said control signal produced by a noise pulse in said video signal, said video signal coupling means including a second resistance-capacitance coupling network the RC time constant of which controls the speed of restoration of said synchronizing signal separator circuit to normal operation following the development of a noise pulse in said video signal, said control signal being applied to said separator circuit in a direction to compensate for a change in level of the video signal applied to said separator circuit produced by a noise pulse in said video signal whereby to minimize the effect of variations in said RC time constants and to permit optimum correlation of the responses of said first and second resistance-capacitance networks to noise pulses in said video signal.

3. In a television receiver including amplifier means for supplying an amplified modulated carrier signal and detector means for demodulating said amplified modulated carrier signal to produce a video signal having synchronizing pulse components, a synchronizing signal separator circuit operative to respond to portions of an input signal within a certain range to develop an output signal, video signal coupling means for A.C. coupling said video signal to said separator circuit and including a first resistance-capacitance coupling network the RC time constant of which controls the speed of restoration of said synchronizing signal separator circuit to normal operation following the development of a noise pulse in said video signal, control means for regulating the level of operation of said separator circuit relative to the level of said video signal to produce maximum correspondence of said output signal to said synchronizing pulse components of said video signal and including means for developing a control signal having an amplitude corresponding to the amplitude of the carrier component of said amplified modulated carrier signal, means for applying said control signal to said separator circuit to control the level of operation thereof, and gain control coupling means for applying said control signal to said amplifier means to decrease the gain of said amplifier means in response to an increase in the amplitude of said carrier component of said amplified modulated carrier signal and including a second resistance-capacitance network the RC time constant of which controls the speed at which the gain of said amplifier means is changed in response to a change in said control signal produced by a noise pulse in said video signal, said control signal being applied to said separator circuit in a direction to compensate for a change in level of the video signal applied to said separator circuit produced by a noise pulse in said video signal, whereby to minimize the effect of variations in said RC time constant and to permit optimum correlation of the responses of said first and second resistance-capacitance network to noise pulses in said video signal.

4. In a television receiver including amplifier means for supplying an amplified modulated carrier signal and detector means for demodulating said amplified modulated carrier to produce a video signal having synchronizing pulse components, a synchronizing signal separator circuit operative to respond to portions of an input signal within a certain range to develop an output signal and including an amplifier device having an input electrode, video signal coupling means for A.C. coupling said video signal to said input electrode, and control means for regulating the level of operation of said separator circuit relative to the level of said video signal to produce maximum correspondence of said output signal to said synchronizing pulse components of said video signal and including means for applying a variable bias signal to said input electrode, said variable bias signal being effective to cause saturation of said amplifier device during tips of said synchronizing pulse components irrespective of variations in the amplitude of said video signal.

References Cited

UNITED STATES PATENTS

| | | | |
|---|---|---|---|
| 2,293,528 | 8/1942 | Barco et al. | 178—7.3 |
| 2,913,523 | 11/1959 | Freedman | 178—7.3 |
| 3,290,441 | 12/1966 | Humphrey | 178—69.5 |
| 3,341,656 | 9/1967 | Szeremy | 178—7.3 |
| 2,601,191 | 6/1952 | Wendt | 178—7.3 |
| 3,102,925 | 9/1963 | Dome | 178—7.5 |

ROBERT L. GRIFFIN, Primary Examiner

ROBERT L. RICHARDSON, Assistant Examiner